(12) United States Patent
Yang et al.

(10) Patent No.: US 10,840,820 B2
(45) Date of Patent: Nov. 17, 2020

(54) INTEGRATED CONVERTER WITH HIGH VOLTAGE CHARGER AND LOW VOLTAGE CHARGER

(71) Applicants: Hyundai Motor Company, Seoul (KR); Kia Motors Corporation, Seoul (KR)

(72) Inventors: Jin Young Yang, Gyeonggi-do (KR); Gyu Yeong Choe, Gyeonggi-do (KR); Min Seong Choi, Daejeon (KR); Tae Jong Ha, Seoul (KR); Young Jin Kim, Incheon (KR); Jae Eun Cha, Gyeonggi-do (KR); Dae Woo Lee, Incheon (KR); In Yong Yeo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/518,093

(22) Filed: Jul. 22, 2019

(65) Prior Publication Data
US 2020/0336080 A1 Oct. 22, 2020

(30) Foreign Application Priority Data

Apr. 17, 2019 (KR) .................. 10-2019-0044784

(51) Int. Cl.
*H02M 1/42* (2007.01)
*H02M 7/04* (2006.01)
*H02M 3/158* (2006.01)

(52) U.S. Cl.
CPC ......... *H02M 7/043* (2013.01); *H02M 1/4208* (2013.01); *H02M 3/1582* (2013.01)

(58) Field of Classification Search
CPC ...... H02M 1/42; H02M 7/043; H02M 1/4208; H02J 7/02
See application file for complete search history.

(56) References Cited

U.S. PATENT DOCUMENTS

| 9,758,047 B2* | 9/2017 | Hou .................. B60L 53/20 |
| 2012/0049794 A1* | 3/2012 | Han .................. B60L 1/003 320/109 |

(Continued)

FOREIGN PATENT DOCUMENTS

CN 109728624 A * 5/2019

OTHER PUBLICATIONS

Machine Translation of CN109728624A, EPO translation tool, 10 pages, Mar. 2020 (Year: 2020).*

(Continued)

*Primary Examiner* — Harry R Behm
(74) *Attorney, Agent, or Firm* — Mintz Levin Cohn Ferris Glovsky and Popeo, P.C.; Peter F. Corless

(57) ABSTRACT

An integrated converter is provided. The integrated converter includes a high-voltage charger having a power factor correction (PFC) device configured to compensate a low-frequency ripple and convert an alternating current (AC) voltage of a commercial power source into a direct current (DC) voltage. A first switching module is configured to convert the DC voltage output from the PFC device into an AC voltage and charge a high-voltage battery using the commercial power source and a low-voltage charger that is connected between the PFC device and the first switching module and the high-voltage charger configured to charge a low-voltage battery using the commercial power source or the high-voltage battery.

15 Claims, 15 Drawing Sheets

(56) References Cited

U.S. PATENT DOCUMENTS

| | | | | |
|---|---|---|---|---|
| 2013/0038273 A1* | 2/2013 | Riggio | ............... | H02J 7/00 |
| | | | | 320/107 |
| 2013/0088196 A1* | 4/2013 | Chen | ............... | H02M 3/1582 |
| | | | | 320/109 |
| 2015/0306973 A1* | 10/2015 | Gunnerud | ............... | B60L 58/20 |
| | | | | 320/162 |
| 2018/0222333 A1* | 8/2018 | Khaligh | ............... | H01F 38/08 |
| 2018/0312075 A1* | 11/2018 | Albanna | ............... | B60L 1/003 |
| 2018/0334045 A1* | 11/2018 | Bendani | ............... | H02J 7/022 |

OTHER PUBLICATIONS

Feng, Zhiqiang; Xie, Shaojun; The Simple Construction Method for Three-Level DC Converter Based on Switch-Diode-Capacitor Network; IEEE 8th International Power Electronics and Motion Control Conference (IPEMC-ECCEAsia); Jul. 2016; 7 pages. (Year: 2016).*

* cited by examiner

INTEGRATED CONVERTER WITH HIGH VOLTAGE CHARGER AND LOW VOLTAGE CHARGER

CROSS-REFERENCE TO RELATED APPLICATION

This application is claims the benefit of priority to Korean Patent Application No. 10-2019-0044784, filed on Apr. 17, 2019, the entire contents of which are incorporated herein by reference.

TECHNICAL FIELD

The present disclosure relates to an integrated converter, and more particularly, to technologies of reducing a weight, volume, and price of the integrated converter.

BACKGROUND

Recently, as countries have been promoting increases in fuel economy regulations and the development and propagation of environmental vehicles, there has been a rapid increase in the demand of plug-in hybrid electric vehicles/electric vehicles (PHEVs/EVs). However, inconvenience due to a long charge time and a short driving distance and due to a high vehicle pricing, consumer confidence in environmental vehicles is not high yet. Thus, development has been in progress in the direction of increasing a driving distance by mounting a high-capacity battery.

However, it is necessary to increase the capacity of a battery charger to reduce a charge time increased according to an increase in battery capacity. When the capacity of the charger is increased, sizes and the cost of materials are increased in proportion to the capacity. Since each of environmental vehicles has a narrow internal space and is more expensive than a vehicle having a conventional internal-combustion engine, reducing size and saving the cost of materials while increasing the capacity of a charger are emerging as an important challenge.

SUMMARY

The present disclosure provides an integrated converter for connecting a low-voltage charger with an output end of a power factor correction (PFC) device of a high-voltage charger to reduce overall weight, volume, and price. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an integrated converter may include: a high-voltage charger having a power factor correction (PFC) device that compensates a low-frequency ripple and converts an alternating current (AC) voltage of a commercial power source into a direct current (DC) voltage; a first switching module configured to convert the DC voltage output from the PFC device into an AC voltage and the high-voltage charger configured to charge a high-voltage battery using the commercial power source and a low-voltage charger that is connected between the PFC device and the first switching module and configured to charge a low-voltage battery using the commercial power source or the high-voltage battery.

In an exemplary embodiment, the low-voltage charger may include a converter configured to convert a voltage level of the commercial power source or the high-voltage battery and apply the converted voltage to the low-voltage battery. In addition, the converter may include a buck converter or a 3-level buck converter as a non-isolation DC-DC converter. The converter may include a capacitor connected to both ends of the low-voltage battery, a diode connected in parallel with the capacitor, an inductor disposed between the capacitor and the diode, and a switching element connected to the inductor and an output end of the PFC device. When the switching element is turned on, voltage output from the PFC device may be stored in the inductor, and, when the switching element is turned off, voltage stored in the inductor may be applied to the low-voltage battery, when the low-voltage battery is charged using the commercial power source.

Further, the converter may include a first capacitor and a second capacitor which are connected to both ends of the low-voltage battery and are connected in series, an inductor disposed between the first capacitor and the low-voltage battery and stores voltage, a first switching element and a second switching element which are connected in parallel with the first capacitor and the second capacitor, a first diode which connected to the inductor at an output end thereof and connected to an output end of the PFC device at an input end thereof, and a second diode connected to the low-voltage battery at an input end thereof and connected to the output end of the PFC device at an output end thereof.

The PFC device may include a first diode and a second diode which are connected to first end of the commercial power source and are connected in series, a third diode and a fourth diode which are connected to a second end of the commercial power source and are connected in series, and a first capacitor connected in parallel with the third diode and the fourth diode. A voltage path connected from the commercial power source to the first diode, the first capacitor, and the fourth diode may be formed, when the commercial power source has a positive value.

In an exemplary embodiment, a voltage path from the commercial power source to the second diode, the first capacitor, and the third diode may be formed, when the commercial power source has a negative value. The PFC device may further include a first switching element connected in parallel with the first capacitor, a second capacitor connected in parallel with the first switching element, an inductor disposed between the first capacitor and the first switching element, and a fifth diode disposed between the first switching element and the second capacitor.

A voltage path connected to the inductor, the first switching element, and the first capacitor may be formed, when the first switching element is turned on. Additionally, a voltage path connected to the inductor, the fifth diode, the second capacitor, and the first capacitor may be formed, when the first switching element is turned off. The high-voltage charger may further include a transformer configured to transform an AC voltage applied from the first switching module and a second switching module configured to convert the AC voltage transformed by the transformer into a DC voltage.

The first switching module may include a first switching element and a second switching element which are connected in series and have a common node connected to a first end of an input end of the transformer and a third switching element and a fourth switching element which are connected in series and have a common node connected to a second end of the input end of the transformer. The second switching module may include a fifth switching element and a sixth switching element which are connected in series and have a common node connected to a first end of an output end of the transformer and a seventh switching element and an eighth switching element which are connected in series and have a common node connected to a second end of the output end of the transformer.

In an exemplary embodiment, the fifth switching element and the eighth switching element may be turned on and voltage applied from the transformer may be transmitted to the high-voltage battery, when the first switching element and the fourth switching element are turned on upon charging of the high-voltage battery using the commercial power source. In addition, when the fifth switching element and the eighth switching element are turned on, a DC voltage of the high-voltage battery may be converted into an AC voltage, and, when the first switching element and the fourth switching element are turned on, the AC voltage may be converted into a DC voltage to be transmitted to the low-voltage charger, when the low-voltage battery is charged using the high-voltage battery.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
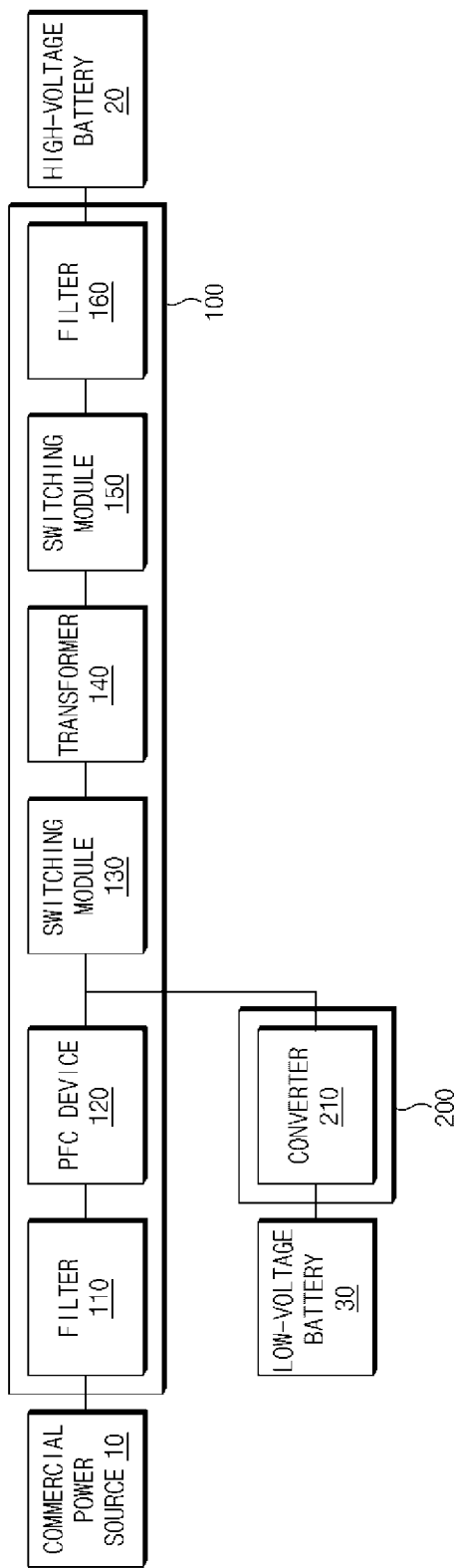
FIG. 1 is a block diagram illustrating a circuit configuration of an integrated converter according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An exemplary embodiment of the present disclosure may disclose technologies of connecting a low-voltage charger with an output end of a power factor correction (PFC) device of a high-voltage charger in an integrated converter to reduce a weight, volume, and price of the integrated converter.

Figure 2:
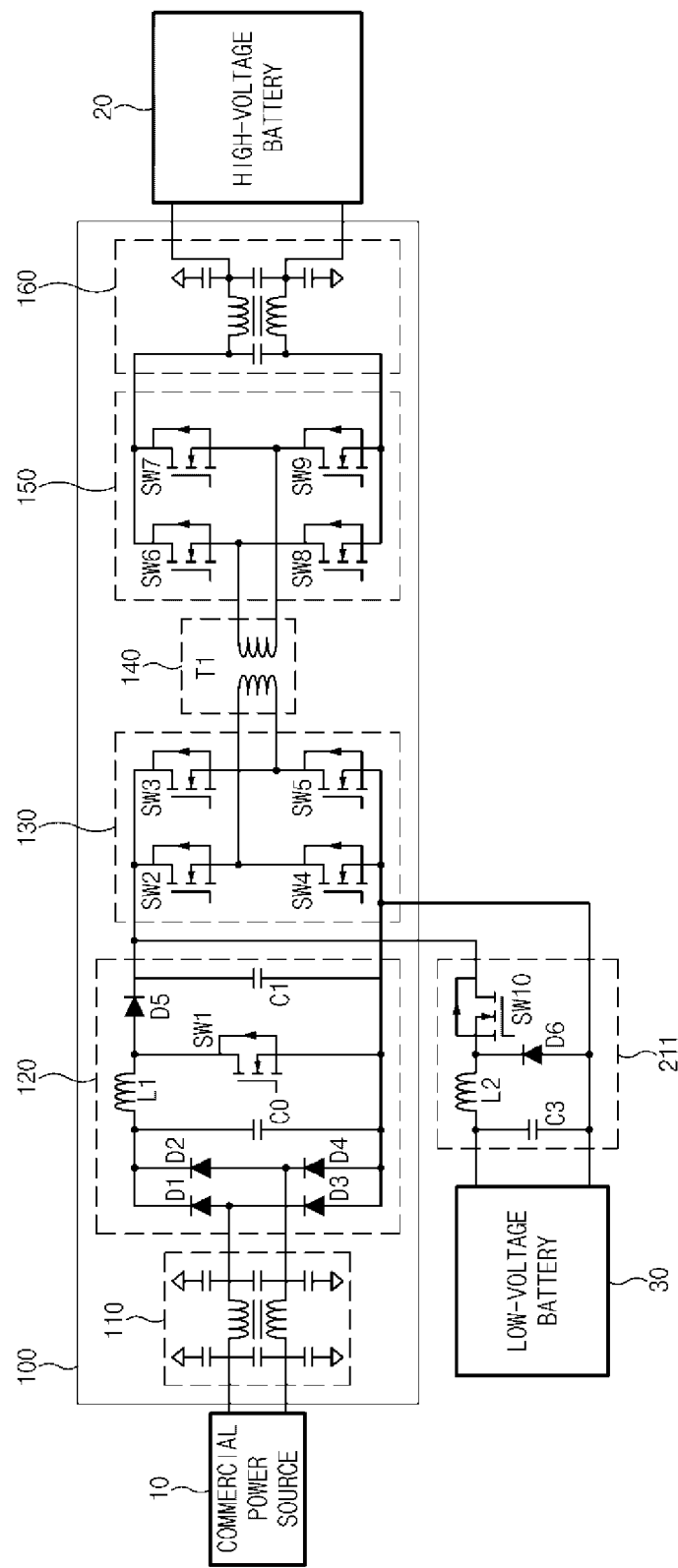
FIG. 2 is a circuit diagram illustrating a converter of a low-voltage charger of an integrated converter according to an exemplary embodiment of the present disclosure.
Figure 3:
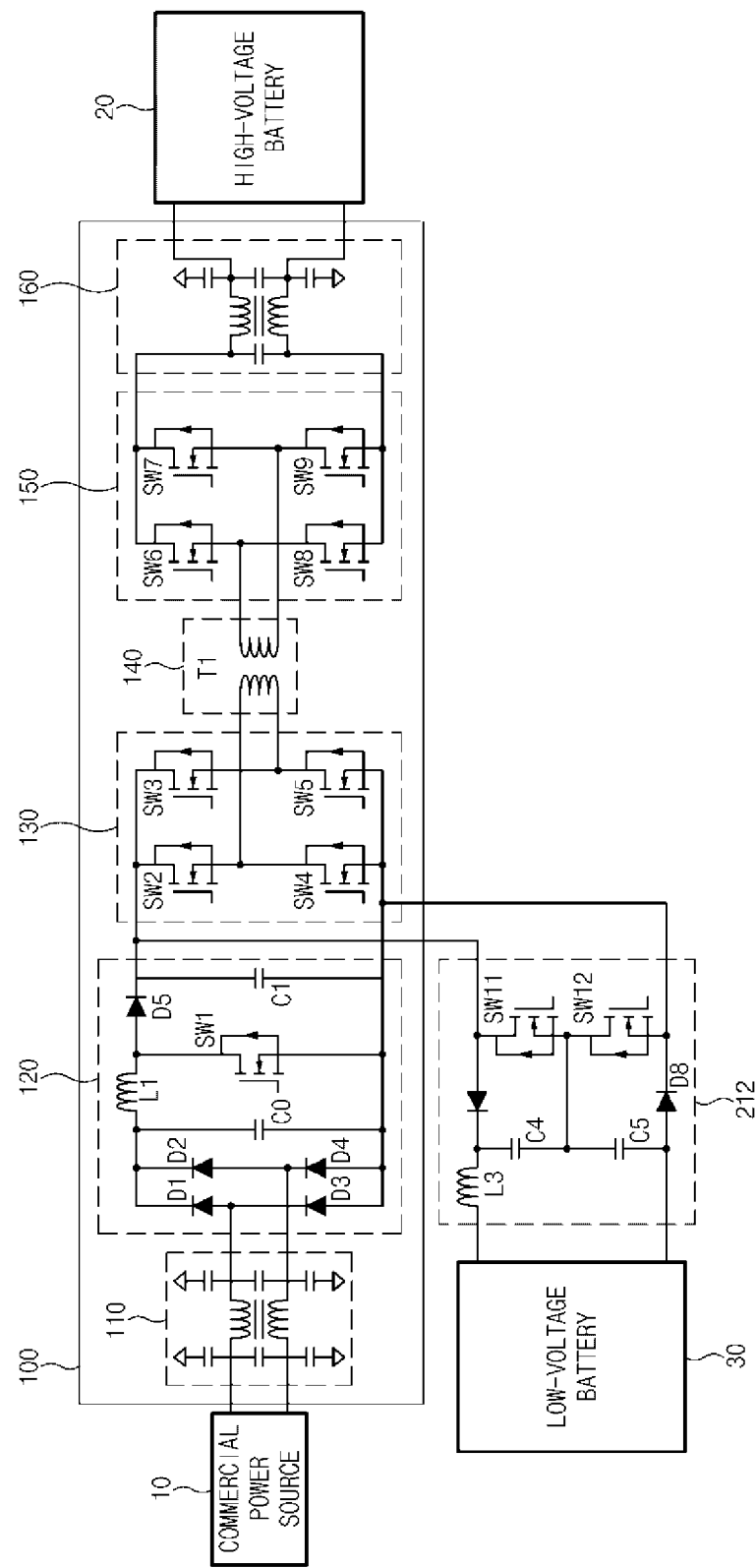
FIG. 3 is a circuit diagram illustrating a converter of a low-voltage charger of an integrated converter according to another exemplary embodiment of the present disclosure.

Hereinafter, a description will be given in detail of exemplary embodiments of the present disclosure with reference to FIGS. 1 to 8B. FIG. 1 is a block diagram illustrating a circuit configuration of an integrated converter according to an exemplary embodiment of the present disclosure. FIG. 2 is a circuit diagram illustrating a converter of a low-voltage charger of an integrated converter according to an exemplary embodiment of the present disclosure. FIG. 3 is a circuit diagram illustrating a converter of a low-voltage charger of an integrated converter according to another exemplary embodiment of the present disclosure.

Referring to FIG. 1, the integrated converter according to an exemplary embodiment of the present disclosure may include a high-voltage charger 100 and a low-voltage charger 200. The high-voltage charger 100 may be configured to charge a high-voltage battery 20. Accordingly, the high-voltage charger 100 may include a filter 110, a power factor correction (PFC) device 120, a switching module 130, a transformer 140, a switching module 150, and a filter 160. The filter 110 may be an electromagnetic interference filter (EMI) and may be configured to remove noise of a signal. In other words, the filter 110 may be configured to remove noise of a commercial power source 10. Particularly, since a detailed circuit of the filter 110 is an ordinary circuit, a detailed description thereof will be omitted.

The PFC device 120 may be configured to convert an alternating current (AC) component of the commercial power source 10 applied from the filter 110 into a direct current (DC) component to compensate a low-frequency ripple. In other words, power factor correction (PFC) refers to correcting a power factor (e.g., a ratio indicating how efficiently it uses an AC power). The PFC device 120 may be driven as a circuit for correcting a power factor and may enhance power efficiency to stably supply power.

The PFC device 120 may include diodes D1 to D5, inductor L1, capacitors C0 and C1, and switching element SW1. Diodes D1 and D3 may be connected in series, and an output voltage at a first end of the filter 110 may be supplied to a common node of diodes D1 and D3. Diodes D2 and D4 may be connected in series and may be connected in parallel with diodes D1 and D3, and an output voltage at a second end of the filter 110 may be supplied to a common node of diodes D2 and D4. A first end of inductor L1 may be connected to an output end of diodes D1 and D2, and a second end of inductor L1 may be connected to diode D5. Switching element SW1 may be disposed between an output end of diodes D3 and D4 and an output end of inductor L1. Capacitor C1 may be connected to the output end of diodes D3 and D4 and an output end of diode D5.

The switching module 130 may be configured to switch voltage output from the PFC device 120 and supply the switched voltage to the transformer 140. In other words, the switching module 130 may be configured to convert a DC component of an output voltage output from the PFC device 120 into an AC component and provide the converted AC component to the transformer 140. Accordingly, the switching module 130 may include a plurality of switching elements SW2 to SW5. Switching elements SW2 and SW4 may be connected in series between a first and second ends of capacitor C1, and switching elements SW3 and SW5 may be connected in series between the first and second ends of capacitor C1 and may be connected in parallel with switching elements SW2 and SW4 which are connected in series. Voltage output through a common node of switching elements SW2 and SW4 may be applied to a first end of a primary side of transformer T1 included in the transformer 140, and voltage output through a common node of switching elements SW3 and SW5 may be applied to a second end of the primary side of transformer T1 included in the transformer 140.

The transformer 140 may be configured to transform voltage switched by the switching module 130. In particular, the transformer 140 may be an isolation transformer and may include a transformer in which a side (a primary side) which receives an AC power and a side (a secondary side) which supplies power are isolated. As a result, the transformer 140 may be configured to isolate the primary side of transformer T1 from the secondary side to prevent mutual interference between powers and block noise or an impulse abnormal voltage at the primary side. In an exemplary embodiment of the present disclosure, the transformer 140 may perform a function of isolating the commercial power source 10 from a high voltage.

Further, the switching module 150 may be configured to switch an AC component of voltage output from the transformer 140 to a DC component and transmit the switched DC component to the high-voltage battery 20 via the filter 160. Accordingly, the switching module 150 may include a plurality of switching elements SW6 to SW9. Switching elements SW6 and SW8 may be connected in series, and a first end of the secondary side of transformer T1 of the transformer 140 may be connected to a common node of switching elements SW6 and SW8. Switching elements SW7 and SW9 may be connected in series and may be connected in parallel with switching elements SW6 and SW8, and a second end of the secondary side of transformer T1 of the transformer 140 may be connected to a common node of switching elements SW7 and SW9.

The filter 160 may be an electromagnetic interference filter (EMI) like the filter 110, and may be configured to remove noise of voltage output from the switching module 150 and transmit the voltage, the noise of which is removed, to the high-voltage battery 20. In particular, since a detailed circuit of the filter 160 may be an ordinary circuit like the filter 110, a detailed description thereof will be omitted. The low-voltage charger 200 may be configured to charge the low-voltage battery 30. Accordingly, the low-voltage charger 200 may include a converter 210. The converter 210 may be a non-isolation DC/DC converter and may be configured to convert a level of a DC voltage through a switching operation thereof. The converter 210 may be configured to decrease a level of a high voltage applied to charge the low-voltage battery 30 to a level capable of being charged in the low-voltage battery 30. Accordingly, the converter 210 may be configured as a buck converter or a 3-level buck converter.

FIG. 2 illustrates an example in which the converter 210 is configured as a buck converter 211. FIG. 3 illustrates an example in which the converter 210 is configured as a 3-level buck converter 212. Referring to FIG. 2, the buck converter 211 may include capacitor C3, inductor L2, diode D6, and switching element SW10. Capacitor C3 and diode D6 may be connected in parallel to both ends of the low-voltage battery 30. Inductor L2 may be disposed between capacitor C3 and diode D6. Switching element SW10 may be connected to a first end of diode D6 and may be connected to a second end between output ends of the PFC device 120.

In other words, a first end of capacitor C3 may be connected to a first end of the low-voltage battery 30, and a second end of capacitor C3 may be connected to a second end of the low-voltage battery 30. A first end of inductor L2 may be connected to the first end of capacitor C3, and a second end of inductor L2 may be connected to a first end of diode D6. A second end of diode D6 may be connected to the second end of capacitor C3 and one end between the output ends of the PFC device 120.

Referring to FIG. 3, the 3-level buck converter 212 may be configured to decrease a level of voltage applied from the PFC device 120 and the switching module 130 to a level capable of being charged in the low-voltage battery 30 and may be configured to increase a voltage transmission rate. Accordingly, the 3-level buck converter 212 may include inductor L3, capacitors C4 and C5, diodes D7 and D8, and switching elements SW11 and SW12.

In particular, capacitors C4 and C5 may be connected in series, and inductor L3 may be disposed between a first end of capacitor C4 and the low-voltage battery 30. Switching elements SW11 and SW12 may be connected in series and may have a structure which is connected in parallel with capacitors C4 and C5 which are connected in series. A common node of switching elements SW11 and SW12 may be connected to a common node of capacitors C4 and C5.

Diode D7 may be connected between a first end of capacitor C4 and a first end of switching element SW11. In particular, an input end of diode D7 may be connected to a first end of an output end of the PFC device 120, and an output end of diode D7 may be connected with inductor L3. Diode D8 may be connected between a second end of capacitor C5 and a second end of switching element SW12. An input end of diode D8 may be connected with the low-voltage battery 30, and an output end of diode D8 may be connected with a second end of the output end of the PFC device 120.

Figure 4:
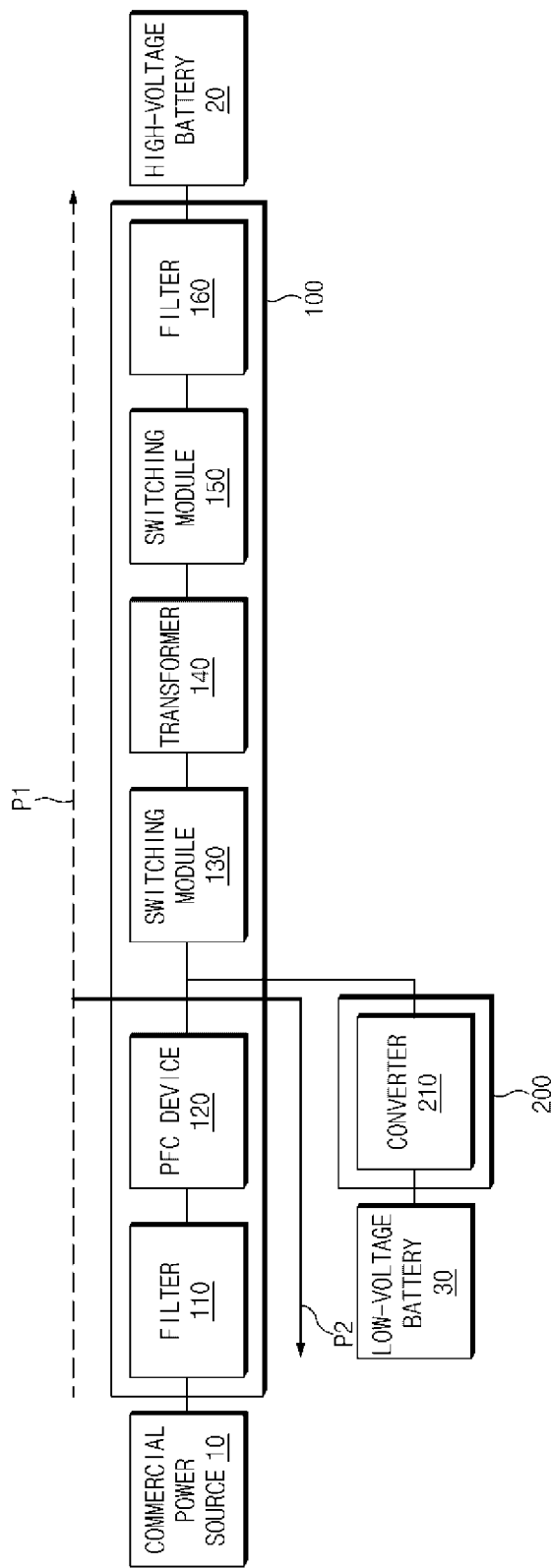
FIG. 4 is a block diagram illustrating an operation of charging a high-voltage battery and a low-voltage battery using a commercial power source of an integrated converter according to an exemplary embodiment of the present disclosure.

FIG. 4 is a block diagram illustrating an exemplary operation of charging a high-voltage battery and a low-voltage battery using a commercial power source of an integrated converter according to an exemplary embodiment of the present disclosure. When a vehicle is not being driven, a speed of the vehicle is greater than "0" and is less than or equal to a predetermined speed. FIG. 4 illustrates an example of charging a high-voltage battery 20 and a low-voltage battery 30 using a commercial power source (an external power source) 10.

Referring to FIG. 4, first describing a method of charging the high-voltage battery 20, noise of an AC component of the commercial power source 10 may be removed through a filter 110 and the AC component, the noise of which is removed, may be applied to a PFC device 120. The PFC device 120 may be configured to convert the AC component of the commercial power source 10 into a DC component through an on/off operation of its switching element SW1 to compensate a power factor.

A switching module 130 may be configured to convert the DC component into an AC component. A transformer 140 may be configured to convert the AC component into a DC component and transmit the converted DC component to the switching module 150. The switching module 150 may then be configured to convert an AC component into a DC component through a switching operation thereof. The filter 160 may be configured to remove noise of the DC component output from the switching module 150 and apply the DC component, the noise of which is removed, to the high-voltage battery 20 to charge the high-voltage battery 20. Accordingly, when the high-voltage battery 20 is charged, charging may be performed along a path such as P1 of FIG. 4.

Moreover, describing a method of charging the low-voltage battery 30, noise of an AC component of the commercial power source 10 may be removed through the filter 110 and the AC component, the noise of which is removed, may be applied to the PFC device 120. The PFC device 120 may be configured to convert the AC component of the commercial power source 10 into a DC component through an on/off operation of its switching element SW1 to compensate a power factor.

A converter 210 may be configured to switch a DC voltage applied from the PFC device 120 to a voltage level for charging the low-voltage battery 30 and apply the switched voltage to the low-voltage battery 30 to charge the low-voltage battery 30. Accordingly, when the low-voltage battery 30 is charged, charging may be performed along a path such as P2 of FIG. 4. When the low-voltage battery 30 is charged along such a path, since noise of the commercial power source 10 is filtered by the filter 110 of the high-voltage charger 100, a separate filter may be omitted in the low-voltage charger 200.

Furthermore, when the low-voltage battery 30 is charged, since there is isolation between the high-voltage battery 20 and the low-voltage battery 30 by the transformer 140, a separate transformer may be omitted in the low-voltage charger 200. Moreover, since it is unnecessary to include the separate transformer in the low-voltage charger 200, it is unnecessary to include a separate switching module for converting a DC voltage into an AC voltage in the low-voltage charger 200. Thus, the low-voltage charger 200 according to an exemplary embodiment of the present disclosure may perform low-voltage charging using only one component such as the converter 210.

Figure 5:
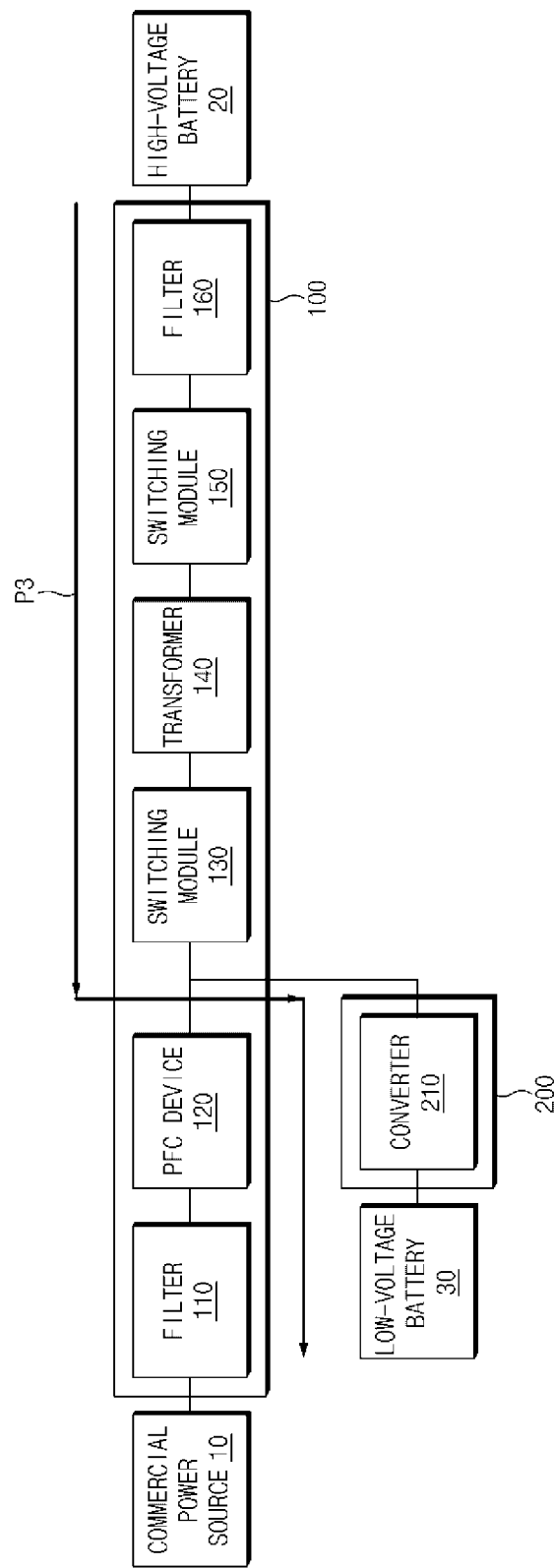
FIG. 5 is a block diagram illustrating an operation of charging a low-voltage battery using a high-voltage battery of an integrated converter according to an exemplary embodiment of the present disclosure.

FIG. 5 is a block diagram illustrating an exemplary operation of charging a low-voltage battery using a high-voltage battery of an integrated converter according to an exemplary embodiment of the present disclosure. In particular, when a vehicle is being driven, the speed may be a speed greater than a predetermined speed. When the vehicle stops, the speed may "0". FIG. 5 illustrates an example of charging a low-voltage battery 30 using a high-voltage battery 20.

Referring to FIG. 5, a filter 160 may be configured to remove noise of a DC voltage of the high-voltage battery 20 and transmit the DC voltage, the noise of which is removed, to a switching module 150. The switching module 150 may then be configured to convert the DC voltage into an AC voltage. A transformer 140 may be configured to convert the AC voltage into a DC voltage and transmit the converted DC voltage to a switching module 130. The switching module 130 may be configured to convert an AC voltage into a DC voltage and transmit the converted DC voltage to a converter 210. The converter 210 may be configured to switch the DC voltage applied from the switching module 130 to a voltage level for charging the low-voltage battery 30 and apply the switched voltage to the low-voltage battery 30 to charge the low-voltage battery 30.

Accordingly, when the high-voltage battery 20 is not charged (e.g., is discharged), the charging may be performed along a path such as P3 of FIG. 5. When the high-voltage battery 20 is not charged, since noise of a high voltage applied from the high-voltage battery 20 is removed by the filter 160, a separate filter in a low-voltage charger 200 may be omitted. Furthermore, when the high-voltage battery 20 is not charged, since there is isolation between the high-voltage battery 20 and the low-voltage battery 30 by the transformer 140, a separate transformer in the low-voltage charger 200 may be omitted. Moreover, when the high-voltage battery 20 is not charged, since conversion between the DC voltage and the AC voltage is performed through the switching modules 130 and 150, a separate transformer in the low-voltage charger 200 may be omitted.

Figure 6A:
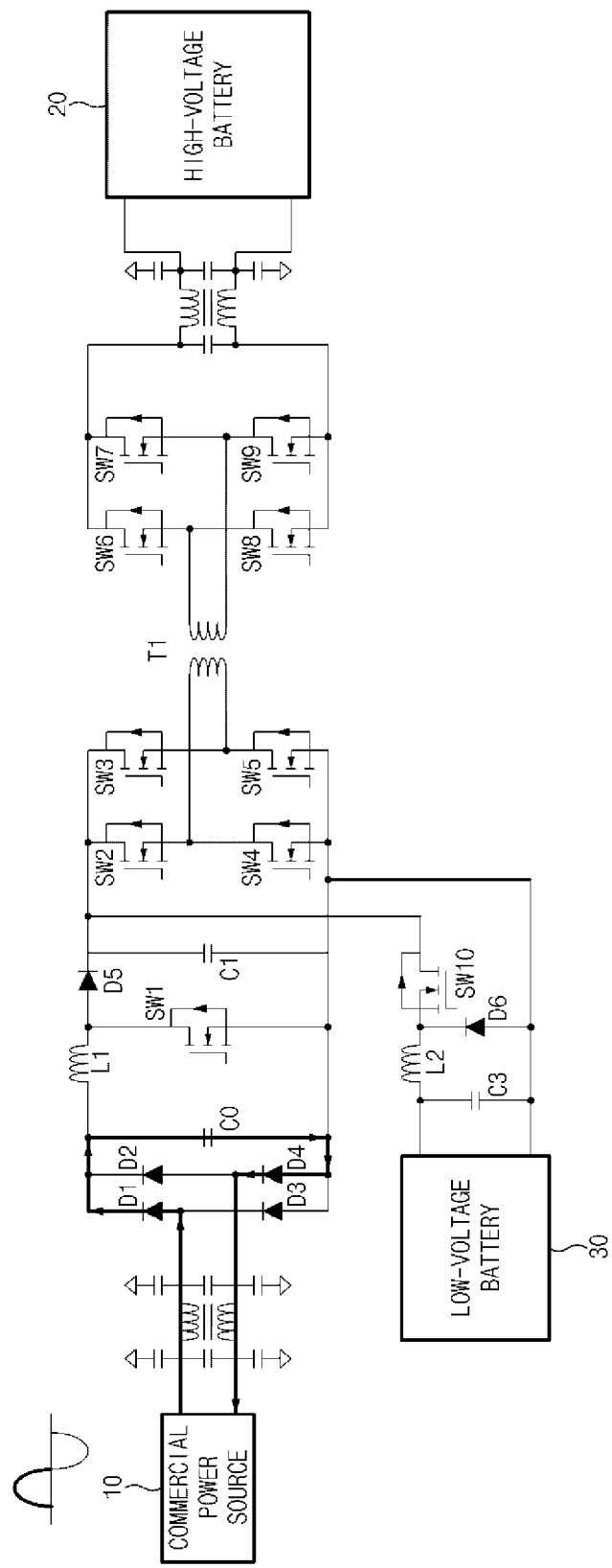
FIGS. 6A, 6B, 6C, 6D, 6E, and 6F are circuit diagrams illustrating voltage flow in an operation of charging a high-voltage battery using a commercial power source according to an exemplary embodiment of the present disclosure.
Figure 6B:
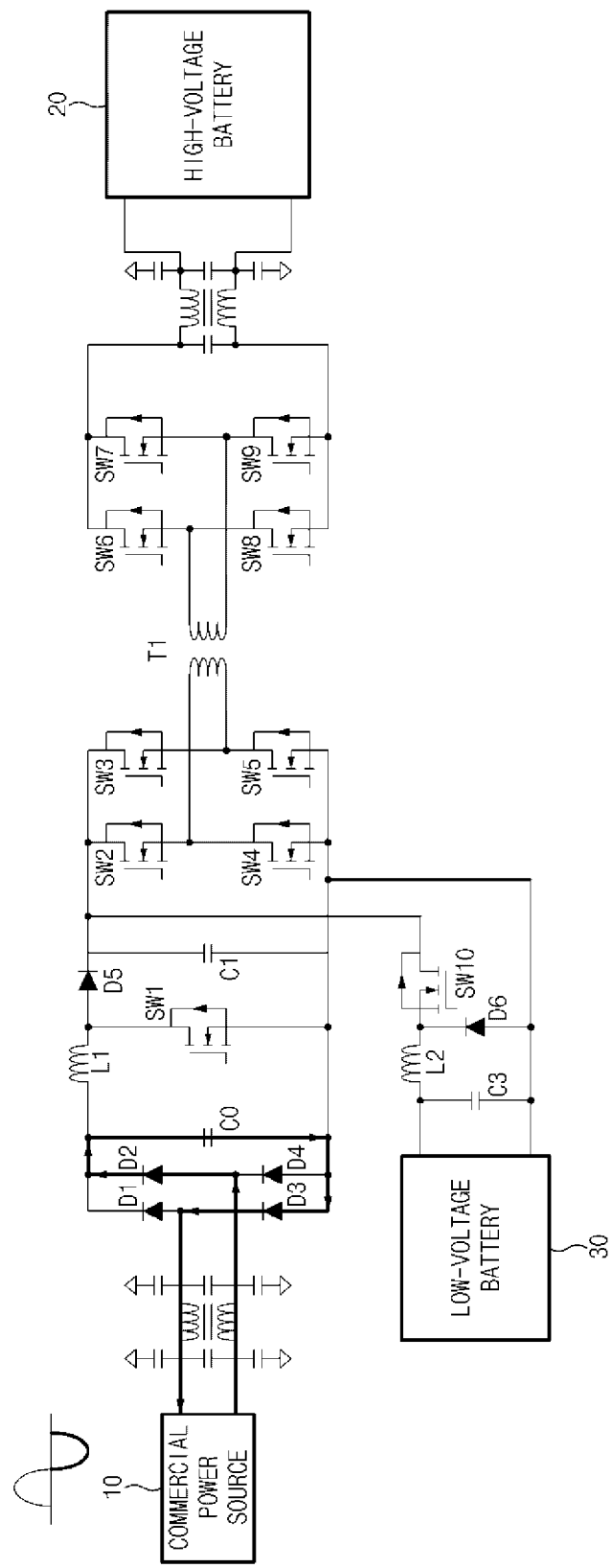

FIGS. 6A to 6F are circuit diagrams illustrating voltage flow in an operation of charging a high-voltage battery using a commercial power source according to an exemplary embodiment of the present disclosure. Referring to FIG. 6A, when a commercial power source 10 has a positive value, a voltage path connected from a filter 110 to diode D1, capacitor C0, and diode D4 may be formed. Referring to FIG. 6B, when the commercial power source 10 is a negative value, a voltage path connected from the filter 110 to diode D2, capacitor C0, and diode D3 may be formed.

Figure 6C:
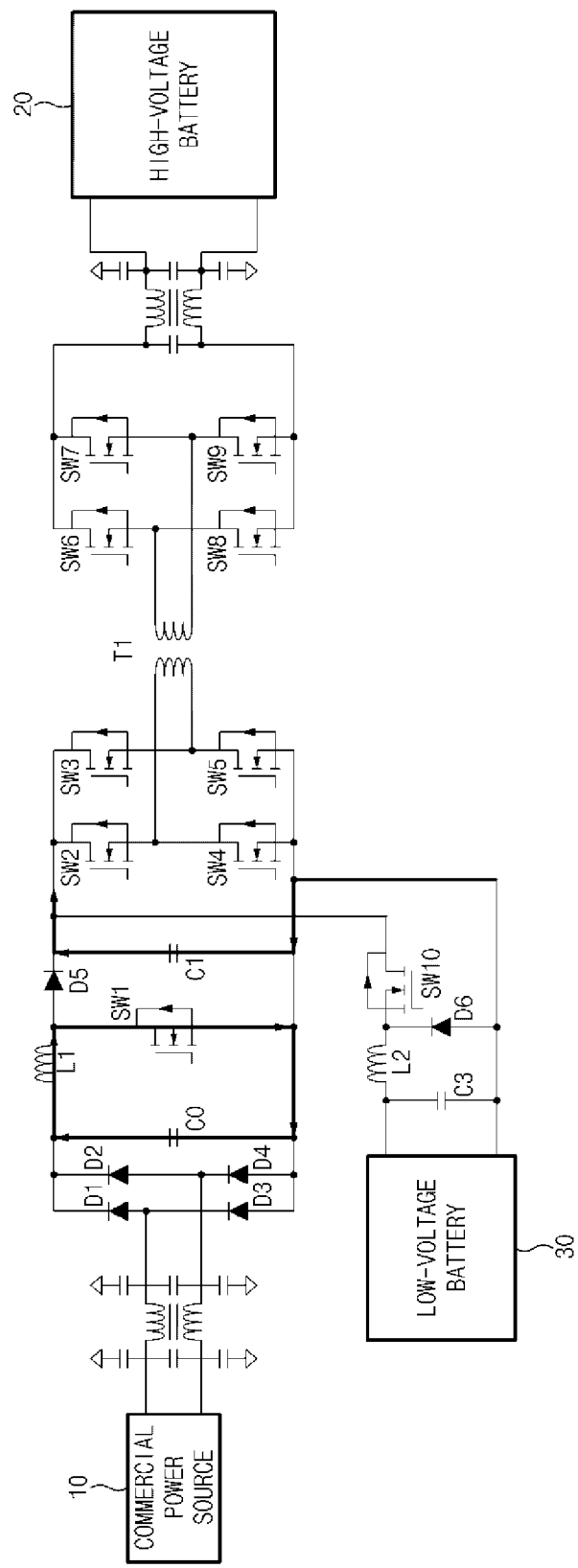
Figure 6D:
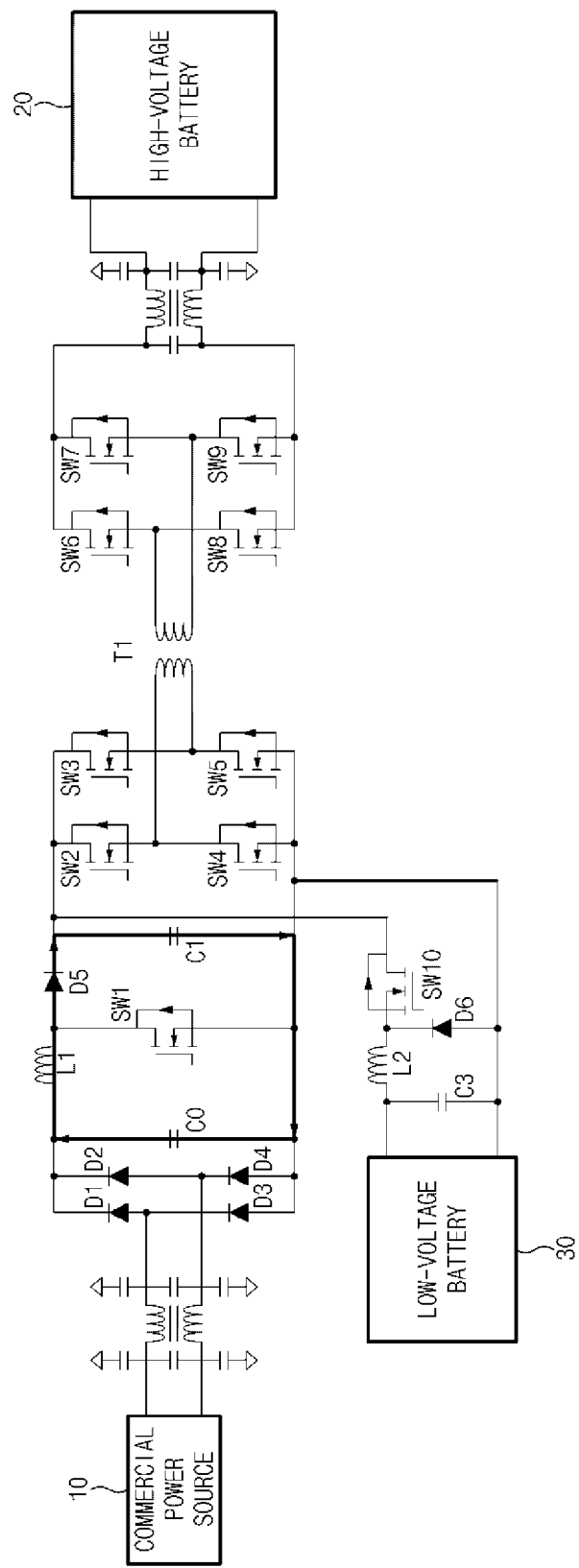
Figure 6E:
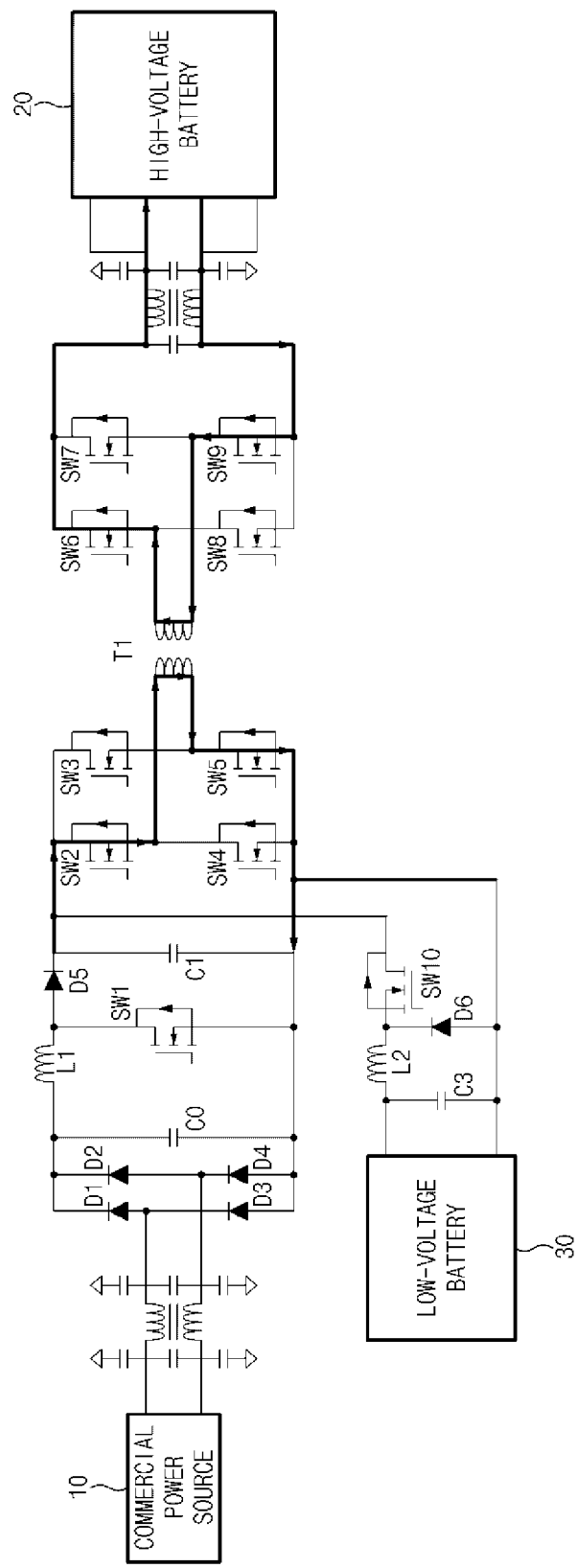

Referring to FIG. 6C, when switching element SW1 is turned on, a voltage path connected to inductor L1, switching element SW1, and capacitor C0 may be formed. In particular, capacitor C1 which is a voltage storage may be configured to perform a discharge operation. Referring to FIG. 6D, when switching element SW1 is turned off, a voltage path of inductor L1, diode D5, and capacitor C0 may be formed. Capacitor C1 which is the voltage storage may be configured to perform a charge operation. Referring to FIG. 6E, when switching elements SW2 and SW5 are turned on, switching elements SW6 and SW9 may be turned on to transmit voltage transmitted through transformer T1 of a transformer 140. Thus, the voltage transmitted through transformer T1 of the transformer 140 may be transmitted to a filter 160 through switching elements SW6 and SW9 to be transmitted to a high-voltage battery 20.

Figure 6F:
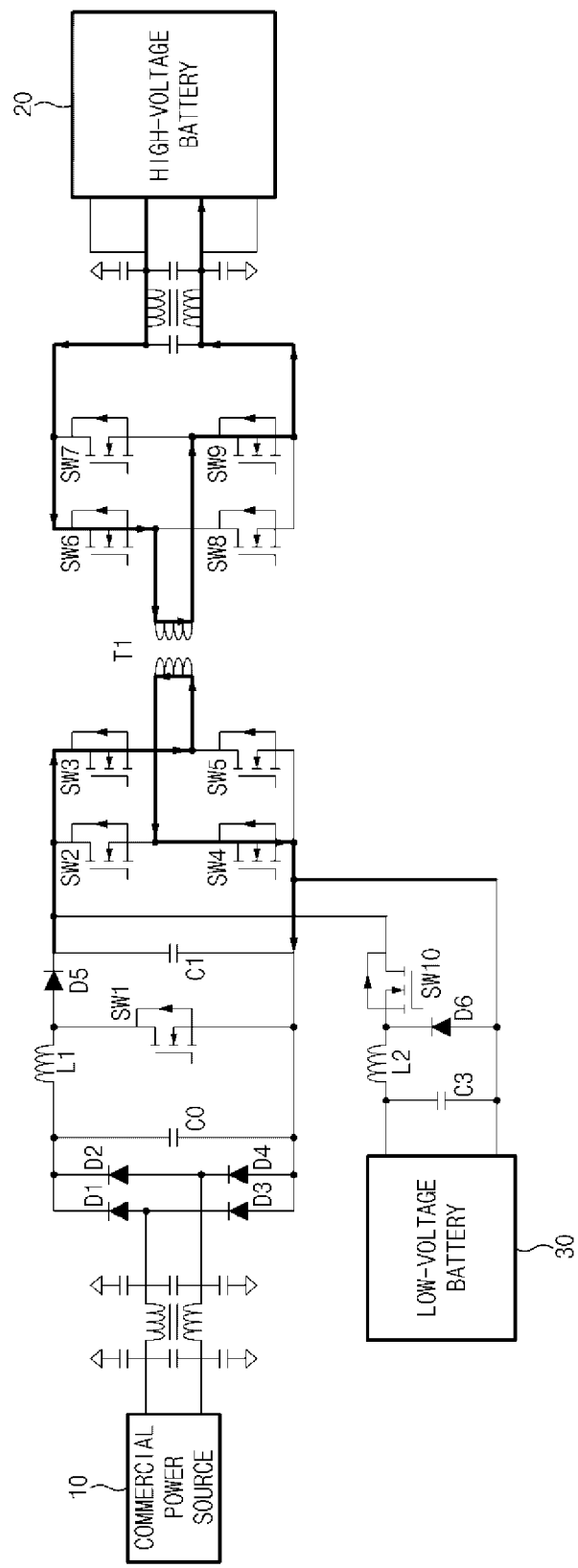

Referring to FIG. 6F, when switching elements SW3 and SW4 are turned on, switching elements SW6 and SW9 may be turned on to transmit voltage transmitted through transformer T1. Thus, the voltage transmitted through transformer T1 of the transformer 140 may be transmitted to the filter 160 through switching elements SW6 and SW9 to be transmitted to the high-voltage battery 20. Accordingly, alternately performance of the switching of switching elements SW2 to SW5 may be executed to convert a DC voltage into an AC voltage to transmit a voltage of transformer T1. Similarly, alternately performance of the switching of switching elements SW6 to SW9 may be execute to convert an AC voltage into a DC voltage.

Figure 7A:
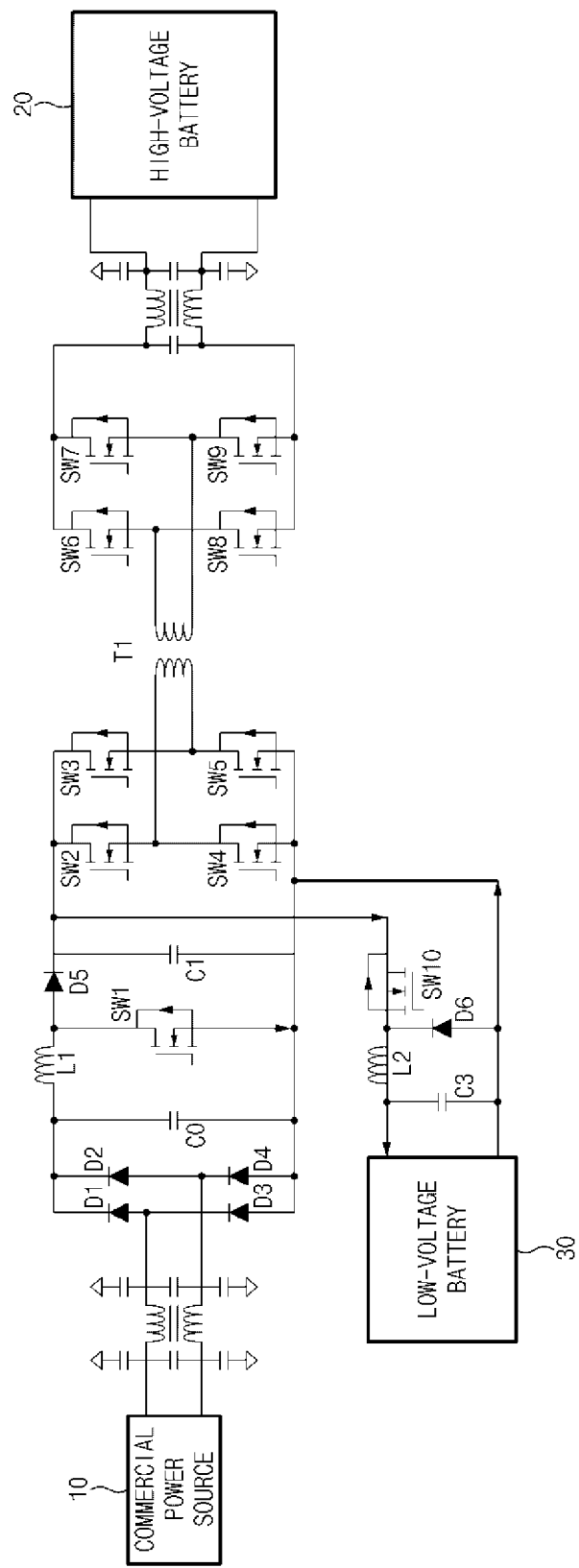
FIGS. 7A and 7B are circuit diagrams illustrating voltage flow in an operation of charging a low-voltage battery using a commercial power source according to an exemplary embodiment of the present disclosure.
Figure 7B:
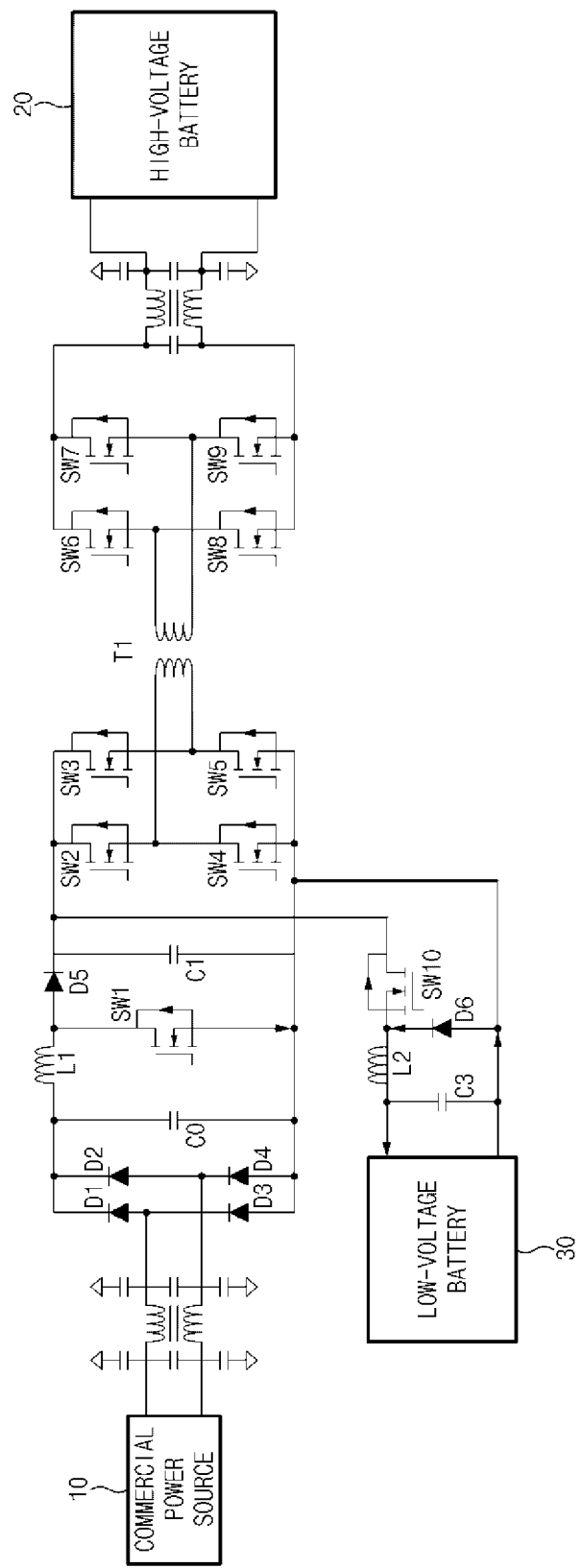

FIGS. 7A and 7B are circuit diagrams illustrating voltage flow in an operation of charging a low-voltage battery using a commercial power source according to an exemplary embodiment of the present disclosure. Referring to FIG. 7A, when switching element SW10 is turned on, voltage between a PFC device 120 and a switching module 130 may be transmitted to a low-voltage battery 30 through switching element SW10 and inductor L2. In particular, the voltage may be stored in inductor L2, and a high voltage may be converted into a low voltage as switching element SW10 is turned on/off. Referring to FIG. 7B, when switching element SW10 is turned off, the voltage stored in inductor L2 may be transmitted to a low-voltage battery 30 through diode D6 and inductor L2.

Figure 8A:
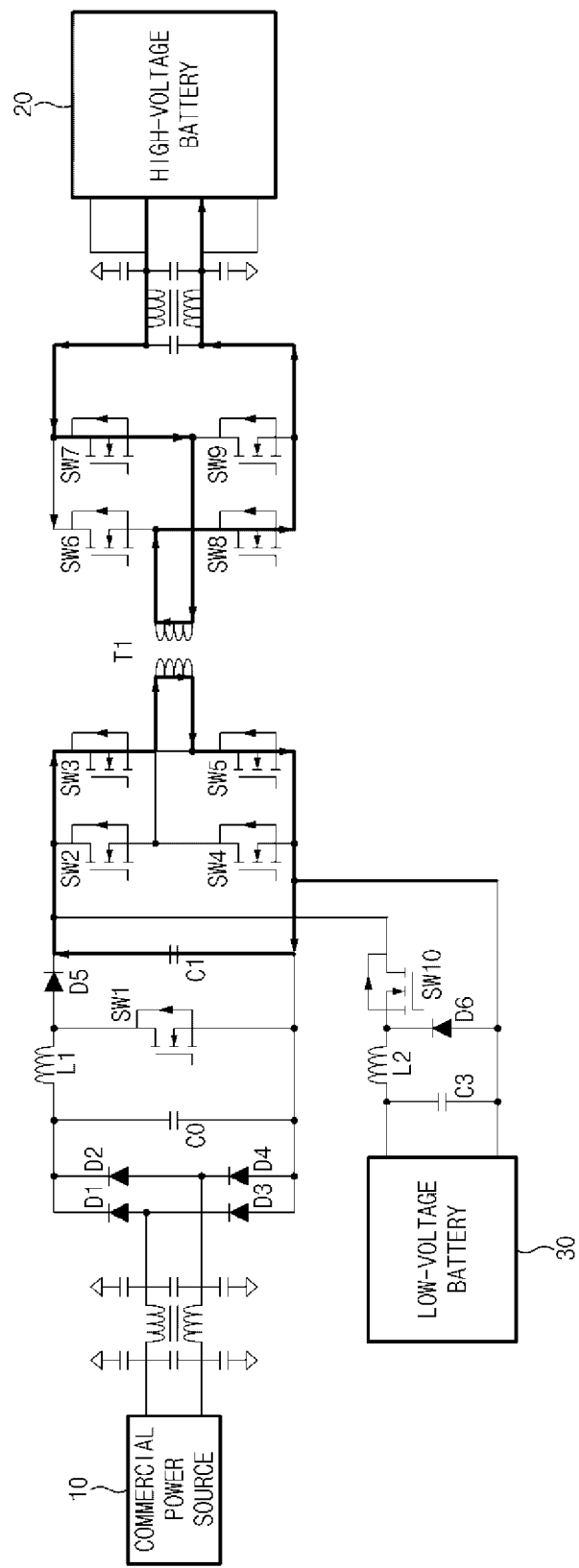
FIGS. 8A and 8B are circuit diagrams illustrating voltage flow in an operation of charging a low-voltage battery using a high-voltage battery according to an exemplary embodiment of the present disclosure.
Figure 8B:
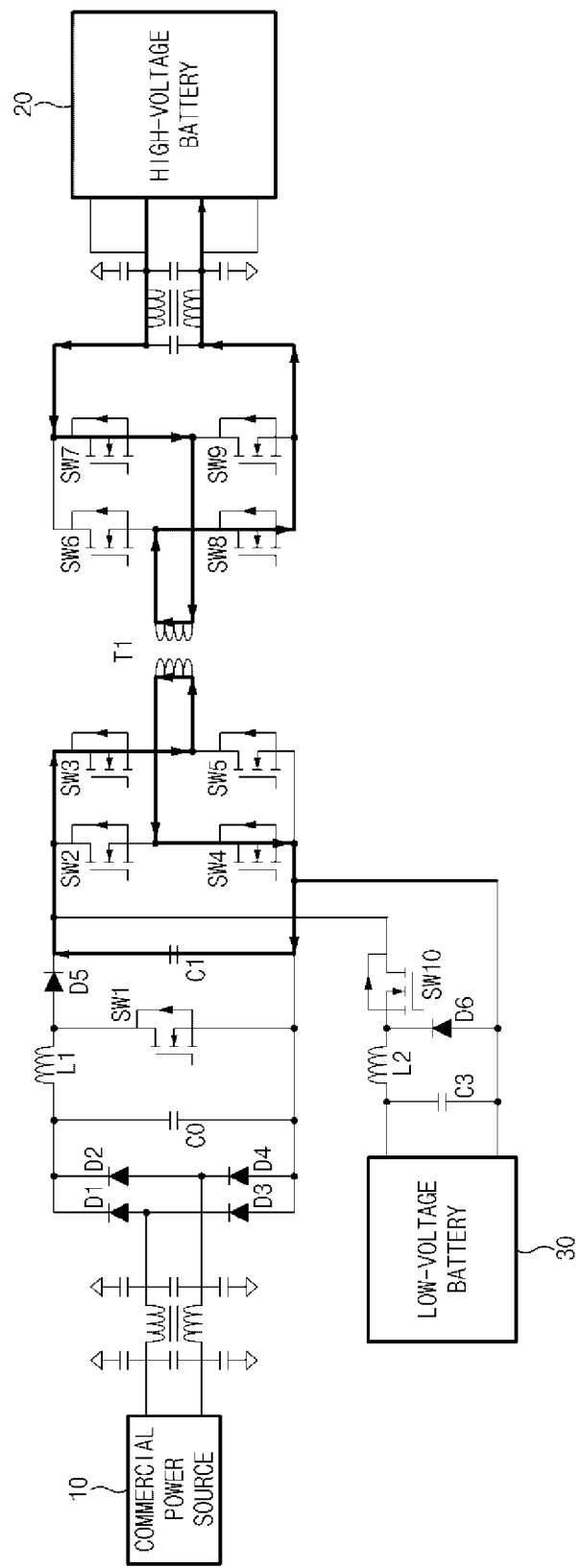

FIGS. 8A and 8B are circuit diagrams illustrating voltage flow in an operation of charging a low-voltage battery using a high-voltage battery according to an exemplary embodiment of the present disclosure. Referring to FIG. 8A, a DC voltage applied from a high-voltage battery 20 may be applied to a low-voltage charger 200 through a switching module 150, a transformer 140, and a switching module 130. In other words, when switching elements SW6 and SW9 of the switching module 150 are turned on, the DC voltage applied from the high-voltage battery 20 may be converted into an AC voltage and the converted AC voltage may be transmitted to the transformer 140.

The transformer 140 may be configured to convert the AC voltage into a DC voltage and transmit the converted DC voltage to the switching module 130. Switching elements SW3 and SW3 may be turned on to convert an AC voltage into a DC voltage, and the converted DC voltage may be transmitted to a converter 210 of the low-voltage charger 200. Referring to FIG. 8B, when switching elements SW7 and SW8 are turned on, a DC voltage applied from the high-voltage battery 20 may be converted into an AC voltage, and the converted AC voltage may be transmitted to the transformer 140.

Additionally, the transformer 140 may be configured to convert the AC voltage into a DV voltage and transmit the converted DC voltage to the switching module 130. Switching elements SW2 and SW5 may be turned on to convert an AC voltage into a DC voltage, and the converted DC voltage may be transmitted to the converter 210 of the low-voltage charger 200. Accordingly, in an integrated DC-DC converter in which the high-voltage charger 100 and the low-voltage charger 200 are integrated, rather than an existing manner in which the low-voltage charger 200 is connected to the high-voltage battery 20, an exemplary embodiment of the prevent disclosure may connect the low-voltage charger 200 to an output end of the PFC device 120 of the high-voltage charger 100, may omit a rectifier, a transformer, a switching module, and a filter which are included in the low-voltage charger 200 of the prior art, and may include only a simplified DC-DC converter in the low-voltage charger 200 to reduce a weight, volume, and price of the integrated DC-DC converter. Since only the configuration of the low-voltage charger 200 is simplified without correction of the circuit of the high-voltage charger 100, it is advantageous to provide a universal design.

The present technology may connect the low-voltage charger with an output end of the PFC device of the high-voltage charger to reduce a weight, volume, and price of the integrated converter. In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:
1. An integrated converter, comprising:
a high-voltage charger configured to charge a low-voltage battery using a commercial power source of a high-voltage battery; and
a low-voltage charger configured to charge the low-voltage battery using the commercial power source or the high-voltage battery,
wherein the high-voltage charger includes:
a power factor correction (PFC) device configured to compensate a low-frequency ripple and to convert an alternating current (AC) voltage of the commercial power source into a direct current (DC) voltage; and a first switching module configured to convert the DC voltage output from the PFC device into an AC voltage, wherein the high-voltage charger is configured to charge the high-voltage battery using the commercial power source;

wherein the low-voltage charger is connected between the PFC device and the first switching module, and wherein the low-voltage charger includes a non-isolation DC-DC converter configured to convert a voltage level of the commercial power source of the high-voltage battery, and apply the converted a voltage to the low-voltage battery.

2. The integrated converter of claim 1, wherein the converter includes a buck converter or a 3-level buck converter as the non-isolation DC-DC converter.

3. The integrated converter of claim 1, wherein the converter includes:
   a capacitor connected to both ends of the low-voltage battery;
   a diode connected in parallel with the capacitor;
   an inductor disposed between the capacitor and the diode; and
   a switching element connected to the inductor and an output end of the PFC device.

4. The integrated converter of claim 3, wherein, when the switching element is turned on, voltage output from the PFC device is stored in the inductor, and, when the switching element is turned off, voltage stored in the inductor is applied to the low-voltage battery, when the low-voltage battery is charged using the commercial power source.

5. The integrated converter of claim 1, wherein the converter includes:
   a first capacitor and a second capacitor connected to both ends of the low-voltage battery and connected in series;
   an inductor disposed between the first capacitor and the low-voltage battery and configured to store voltage;
   a first switching element and a second switching element connected in parallel with the first capacitor and the second capacitor;
   a first diode connected to the inductor at its output end and connected to an output end of the PFC device at an input end thereof; and
   a second diode connected to the low-voltage battery at an input end thereof and connected to the output end of the PFC device at an output end thereof.

6. The integrated converter of claim 1, wherein the PFC device includes:
   a first diode and a second diode connected to a first end of the commercial power source and connected in series;
   a third diode and a fourth diode connected to a second end of the commercial power source and connected in series; and
   a first capacitor connected in parallel with the third diode and the fourth diode.

7. The integrated converter of claim 6, wherein a voltage path connected from the commercial power source to the first diode, the first capacitor, and the fourth diode is formed, when the commercial power source has a positive value.

8. The integrated converter of claim 6, wherein a voltage path from the commercial power source to the second diode, the first capacitor, and the third diode is formed, when the commercial power source has a negative value.

9. The integrated converter of claim 6, wherein the PFC device further includes:
   a first switching element connected in parallel with the first capacitor;
   a second capacitor connected in parallel with the first switching element;
   an inductor disposed between the first capacitor and the first switching element; and
   a fifth diode disposed between the first switching element and the second capacitor.

10. The integrated converter of claim 9, wherein a voltage path connected to the inductor, the first switching element, and the first capacitor is formed, when the first switching element is turned on.

11. The integrated converter of claim 9, wherein a voltage path connected to the inductor, the fifth diode, the second capacitor, and the first capacitor is formed, when the first switching element is turned off.

12. The integrated converter of claim 1, wherein the high-voltage charger further includes:
   a transformer configured to transform an AC voltage applied from the first switching module; and
   a second switching module configured to convert the AC voltage transformed by the transformer into a DC voltage.

13. The integrated converter of claim 12, wherein the first switching module includes:
   a first switching element and a second switching element connected in series and having a common node connected to a first end of an input end of the transformer; and
   a third switching element and a fourth switching element connected in series and having a common node connected to a second end of the input end of the transformer, and
   wherein the second switching module includes:
   a fifth switching element and a sixth switching element connected in series and having a common node connected to a first end of an output end of the transformer; and
   a seventh switching element and an eighth switching element connected in series and having a common node connected to a second end of the output end of the transformer.

14. The integrated converter of claim 13, wherein the fifth switching element and the eighth switching element are turned on and voltage applied from the transformer is transmitted to the high-voltage battery, when the first switching element and the fourth switching element are turned on upon charging of the high-voltage battery using the commercial power source.

15. The integrated converter of claim 13, wherein, when the fifth switching element and the eighth switching element are turned on, a DC voltage of the high-voltage battery is converted into an AC voltage, and, when the first switching element and the fourth switching element are turned on, the AC voltage is converted into a DC voltage to be transmitted to the low-voltage charger, when the low-voltage battery is charged using the high-voltage battery.

* * * * *